Figure 1:
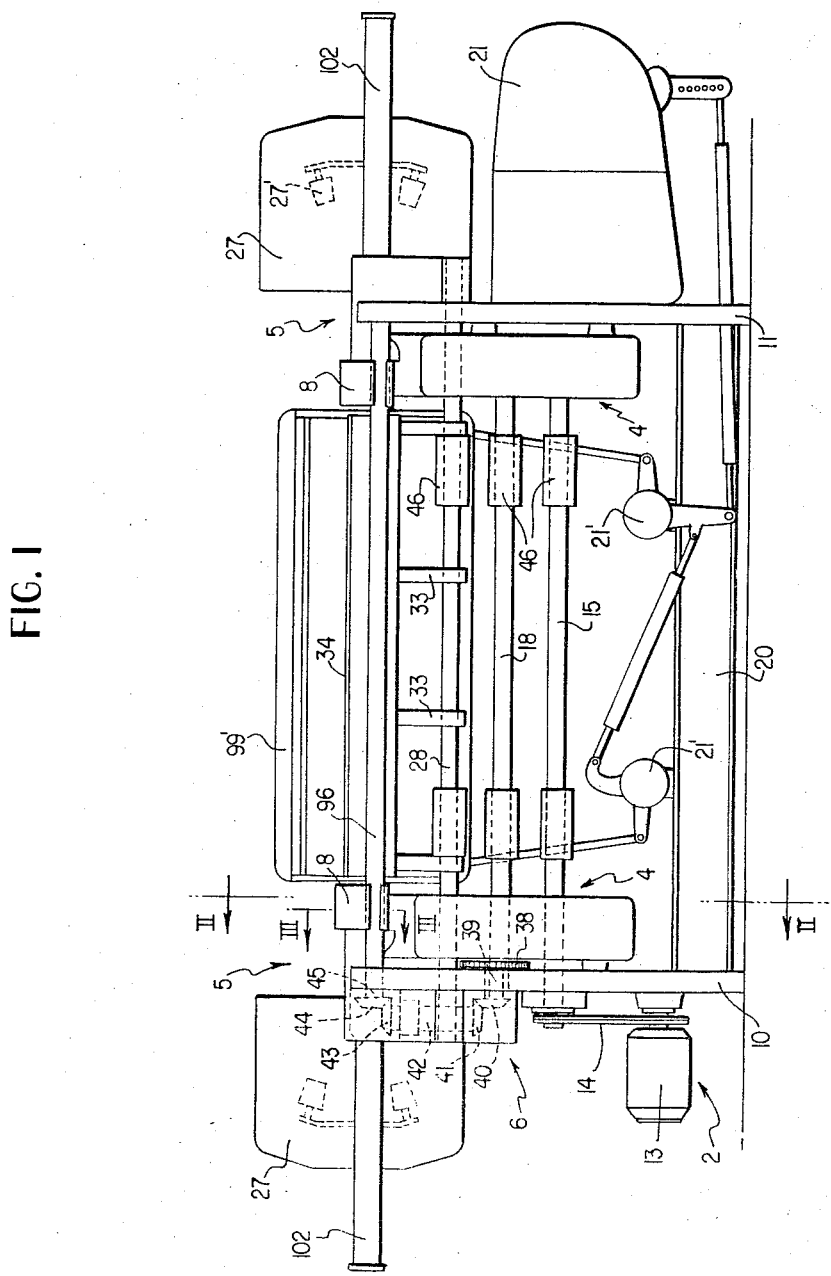

INVENTOR
NIKOLAUS KOKKINIS

BY *James E. Bryan*
ATTORNEY

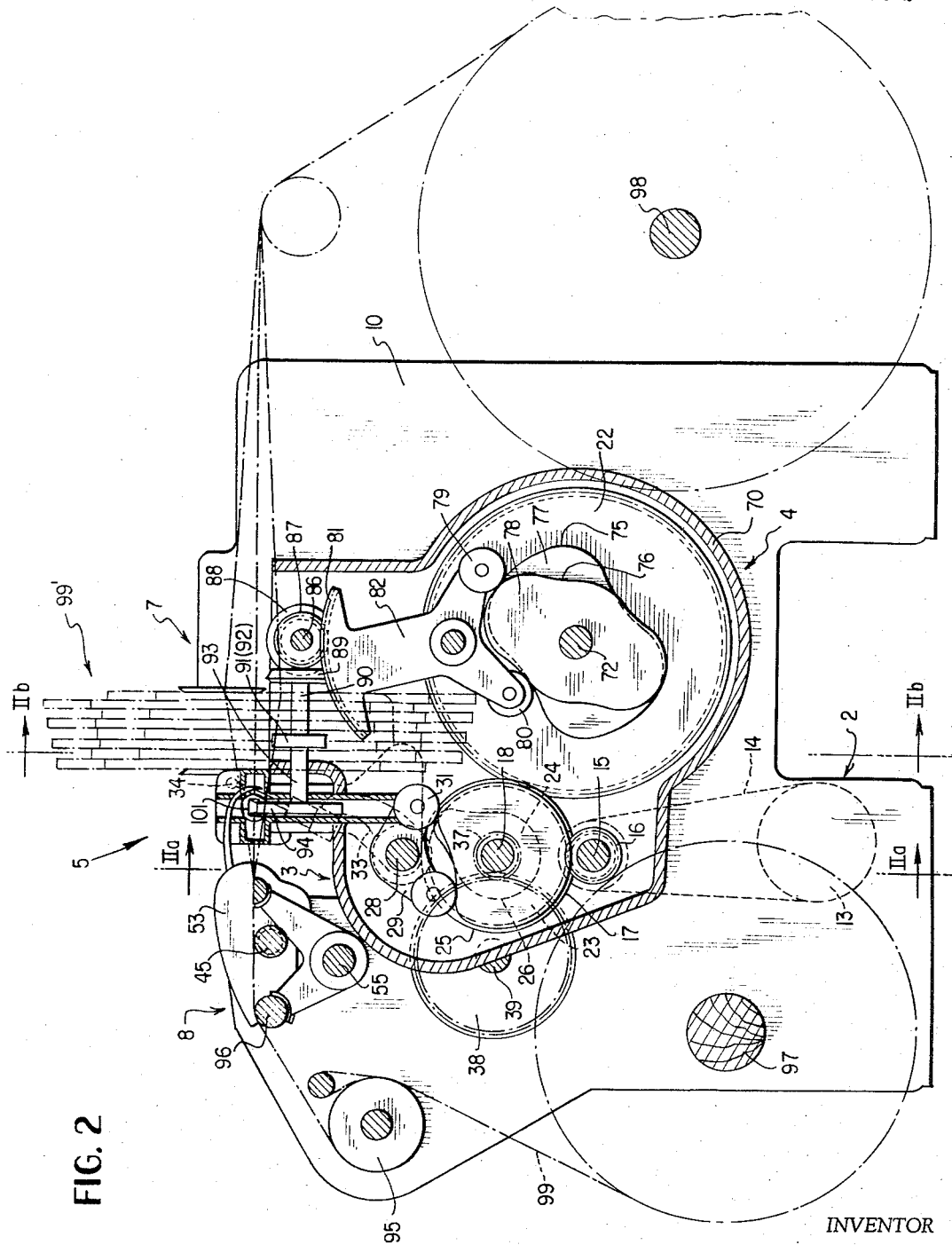

Jan. 23, 1968 N. KOKKINIS 3,364,954
SHUTTLELESS LOOM
Filed Sept. 24, 1965 8 Sheets-Sheet 3

INVENTOR
NIKOLAUS KOKKINIS

BY James E. Bryan
ATTORNEY

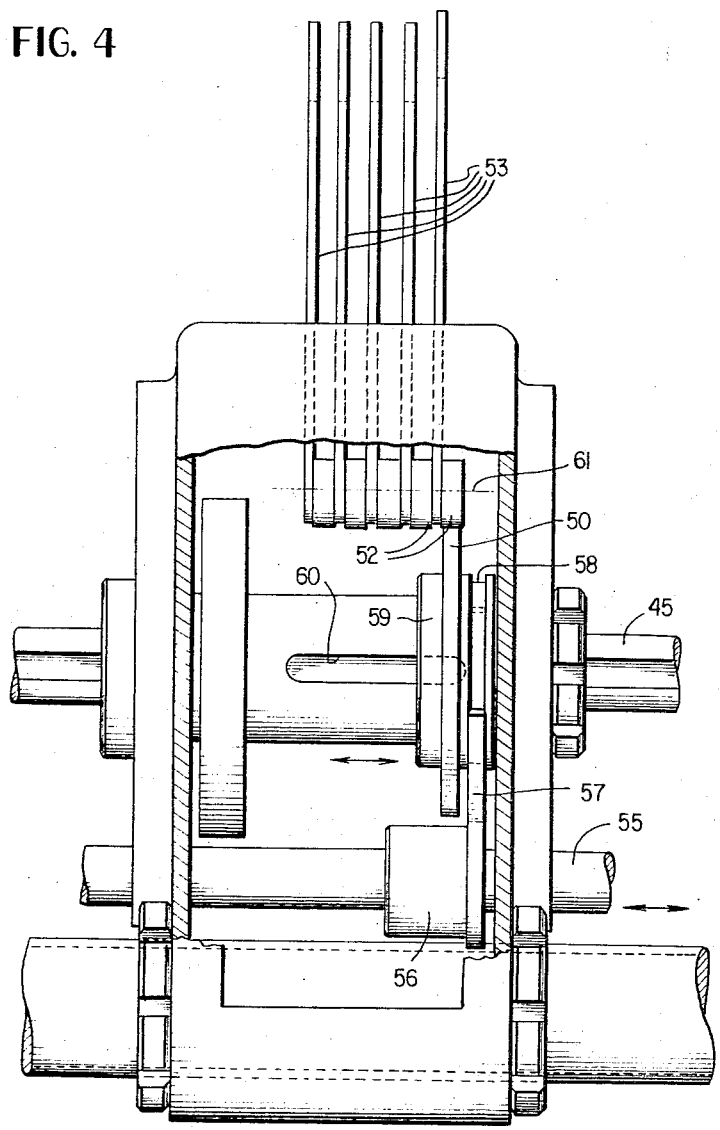

Jan. 23, 1968 N. KOKKINIS 3,364,954
SHUTTLELESS LOOM
Filed Sept. 24, 1965 8 Sheets-Sheet 6
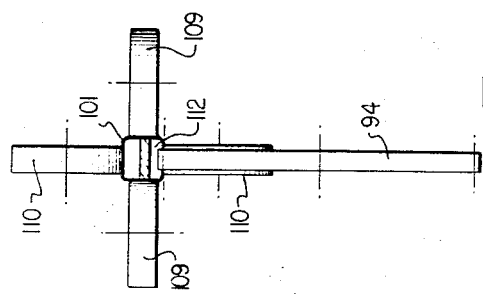
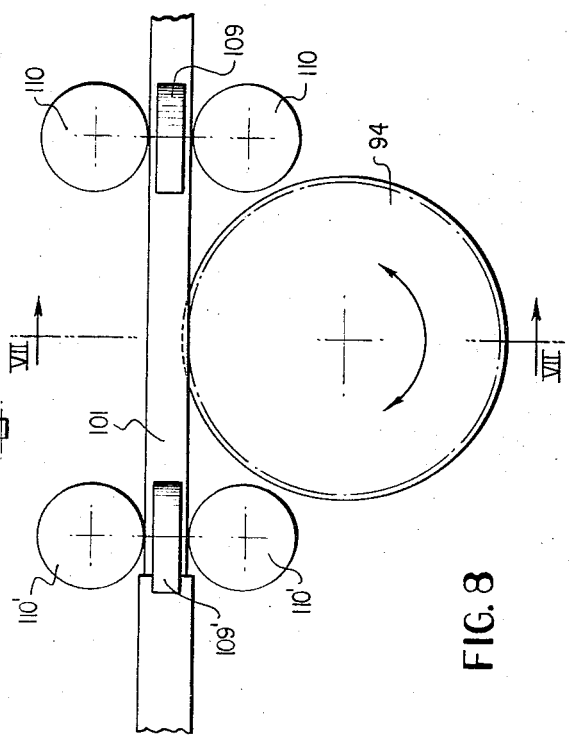
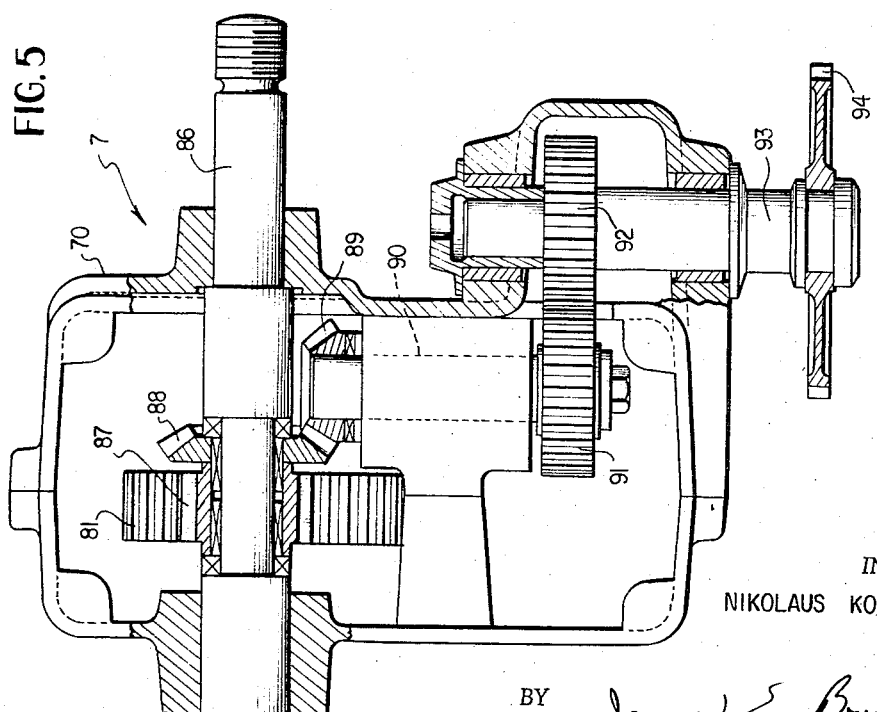
INVENTOR
NIKOLAUS KOKKINIS
BY *James E. Bryan*
ATTORNEY Jan. 23, 1968   N. KOKKINIS   3,364,954
SHUTTLELESS LOOM
Filed Sept. 24, 1965   8 Sheets-Sheet 7
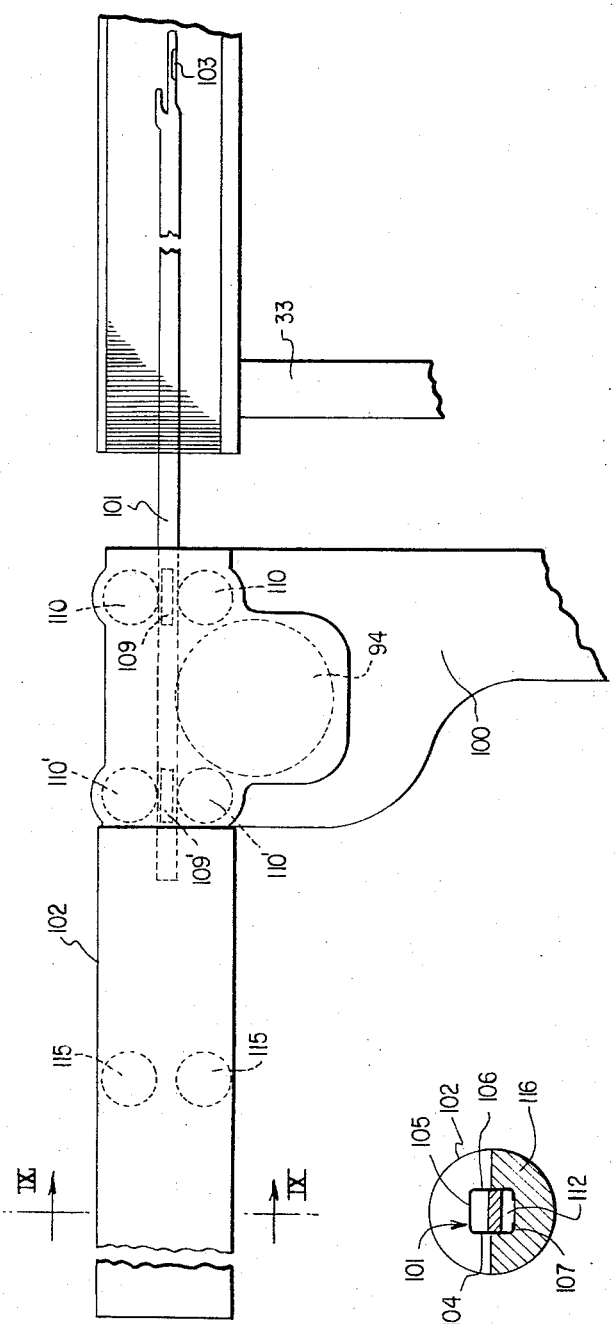
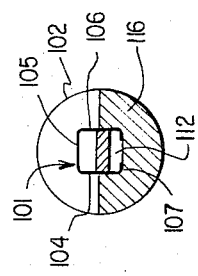
INVENTOR
NIKOLAUS KOKKINIS
BY *James E. Bryan*
ATTORNEY

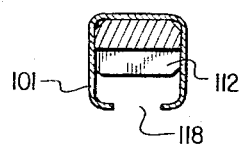
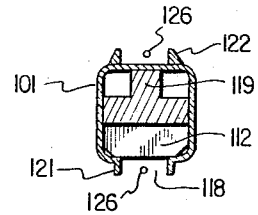
FIG. 11  FIG. 12
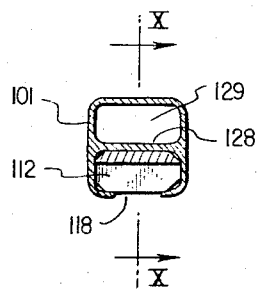
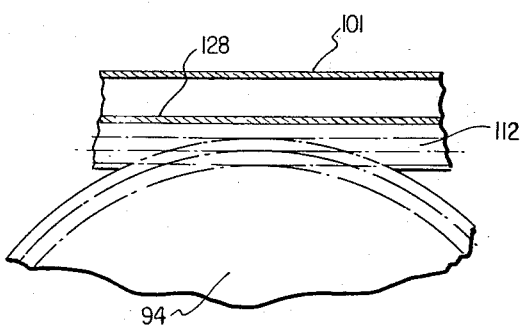
FIG. 13
FIG. 10
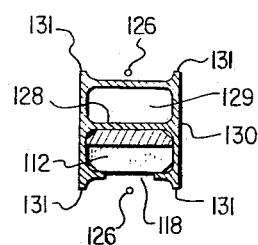
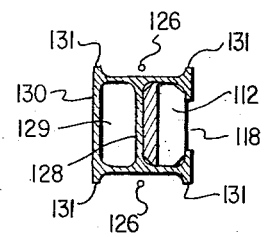
FIG. 14  FIG. 15

United States Patent Office 3,364,954
Patented Jan. 23, 1968

3,364,954
SHUTTLELESS LOOM
Nikolaus Kokkinis, Eriskirch, Germany, assignor to Lindauer Dornier Gesellschaft m.b.H., Lindau (Bodensee), Germany, a corportaion
Filed Sept. 24, 1965, Ser. No. 489,810
Claims priority, application Germany, Oct. 3, 1964, L 48,940
13 Claims. (Cl. 139—122)

The present invention relates to a shuttleless loom in which weft threads are inserted into a shed by means of gripper systems which are adapted to be inserted into and retracted from the shed at least from one side and in which the loom is provided with supply spools, for the weft threads, mounted on stationary parts of the loom.

In this type of loom, weft threads are drawn off by gripper systems from supply spools mounted on stationary parts of the loom and are inserted into a shed by means of the gripper systems. It is possible to insert grippers into the shed from each side of the machine and the weft thread drawn from the supply or delivery spools is transferred from one gripper to the other in the center of the reed. In the constructions of gripper systems heretofore known, long rods or needles are utilized at the ends of which are mounted gripper devices or means for receiving and delivering the weft threads. In other constructions, the gripper devices or means are mounted on flexible bands which are advanced into and retracted from the shed. These bands must have a certain rigidity and are wound onto or unwound from large discs which are driven in alternating directions of rotation. The disadvantage of these bands is that, due to the winding and unwinding operation thereof, they are subjected to a constant alternating bending stress and, further, a perforation is frequently provided for the drive, which not only reduces the rigidity and durability thereof, but is also susceptible to significant wear and tear so that the bands become unusable and must be replaced after a relatively short service life. Furthermore, the flexible bands are not sufficiently stable and permit only a relatively small weaving width. For a larger weaving width, special guiding combs or reeds are required. This constantly alternating insertion and retraction of the guiding combs adversely affects the warp threads. Furthermore, in all the elastic bands, an undesirable friction occurs at the point where the band is advanced from the winding disc into the guide. Added thereto is the inevitable friction of the band in the guides of the disc due to the fact that, because of the elasticity thereof, the band has a tendency to resiliently lift off of the disc.

The gripper rods are inserted, in one of these known types of construction, by means of long levers with a crank drive and linkage. This construction requires a large amount of space for the driving mechanism. Moreover, the masses which must be accelerated and braked are considerable.

The present invention eliminates the drawbacks of the known constructions and provides an arrangement which is uncomplicated insofar as the manufacture thereof is concerned and, while using structural parts which may be easily fabricated, permits a safe drive of the gripper systems. Additionally, as a result of the construction of the present invention, large inertia forces are eliminated and friction is considerably reduced. Also, any vibrations can be suppressed advantageously.

In the construction of the present invention the shuttleless loom in which weft threads are inserted by gripper systems which are inserted and retracted from the shed and which has supply or delivery spools for the weft threads mounted on stationary parts of the machine, includes a central driving means, transmission means for the gripper drives mounted on both sides of the machine within the two side walls of the loom in a housing adapted to be mounted as a single unit, the transmission means at both sides of the machine being driven by the central driving means, means connected with the transmission means for the synchronous operation of the transmission means at both sides of the weaving machine, as well as similar means connected with transmission means mounted at both sides of the machine for the drive of the reed, and transmission means for the weft thread feeding device mounted at only one side of the machine. All of the transmissions are driven from the central driving means.

Due to the construction of the loom of the present invention, a very space-saving arrangement of parts is possible. Since the driving units are mounted on both sides of the machine and are connected with the central driving means in a manner such as to result in a synchronous operation, the result is not only the saving of a considerable amount of space but also replacement of the transmission units is made possible in a very simple manner. By using a single driving motor and coupling the driving units of both sides of the loom with this drive and a pre-stress of the drive shafts between the transmission units, a safe synchronous operation of all coupled transmission units is effectively obtained. Furthermore, an infinitely variable adjustability of the weft thread feeding device permits an adaptation and adjustment to the fabric width to be made so that the weft thread is, at all times, inserted at the length required for a specific weaving width.

Another feature of the loom of the present invention is that the gripper rods consist of a hollow profile and the drive thereof is effected by means of a pinion which extends through a slot in the profile and engages a rack mounted at the inside of the profile. The rack is preferably made from a synthetic material, which affords the advantage that no lubrication is necessary and a large amount of weight is saved. The rack itself is advantageously inserted in the longitudinal direction into the gripper rod and secured therein by cementing. As noted above, the pinion executes a rotary motion, alternating in opposite directions, so that the gripper rods are alternately advanced and retracted. The gripper rods are mounted and guided between pairs of rollers and the construction is such that the driving pinion is positioned within the area of the mounting support and guide. In another feature of the invention, the gripper rod includes, at the sides thereof facing the warp threads of the shed, a pair of rib or web portions each extending in the direction of movement of the gripper rod. The weft threads to be inserted will come to rest between these two web portions and clamping-in of the weft thread between the warp threads constituting the shed and between the gripper rod is effectively eliminated thereby.

Figure 2B:
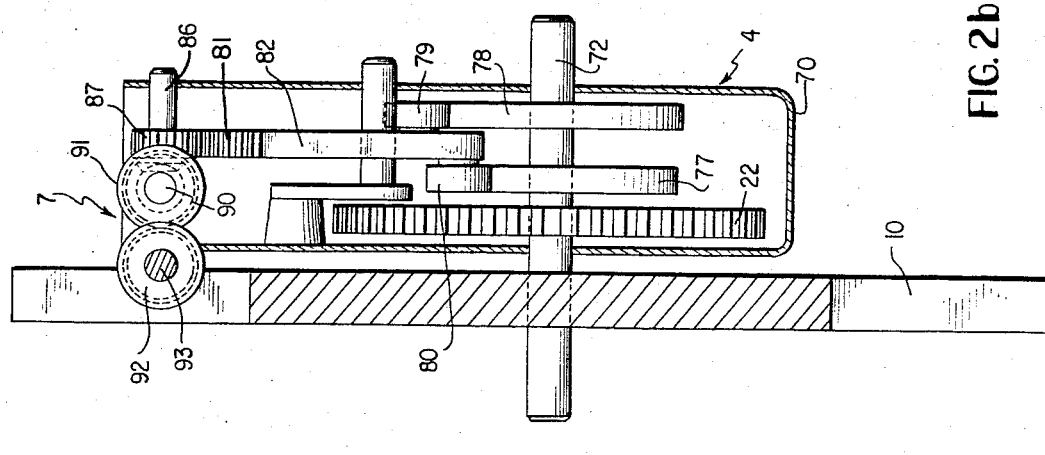
Figure 2A:
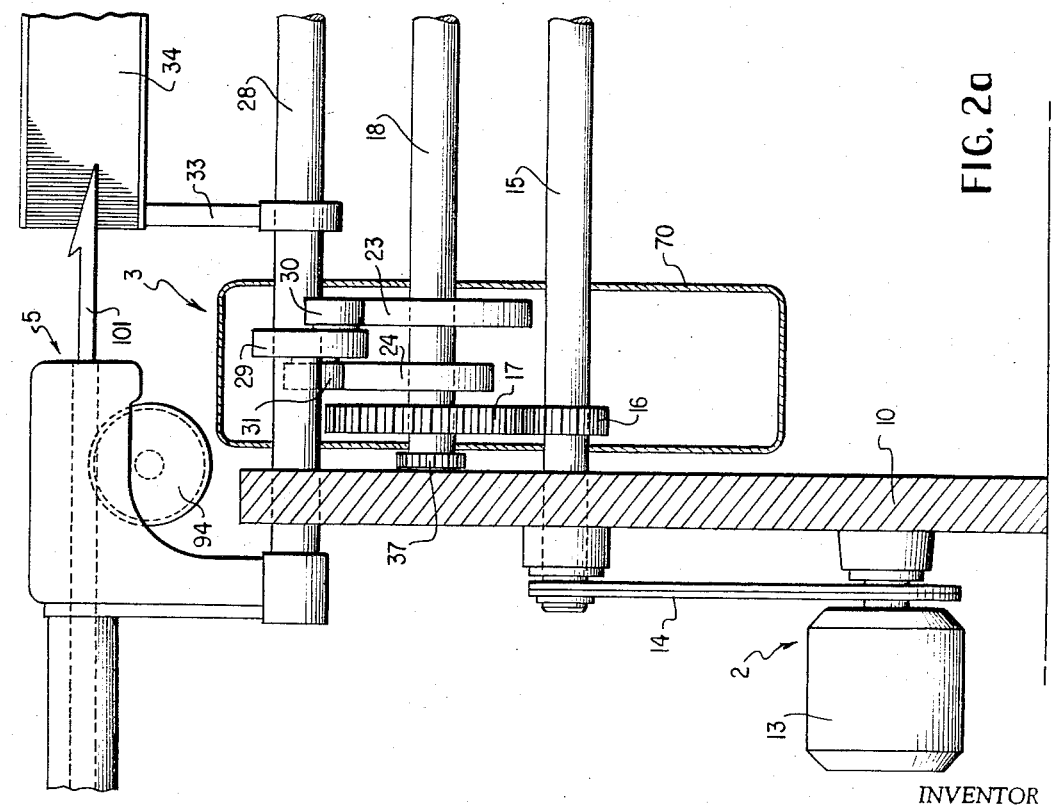
Figure 3:
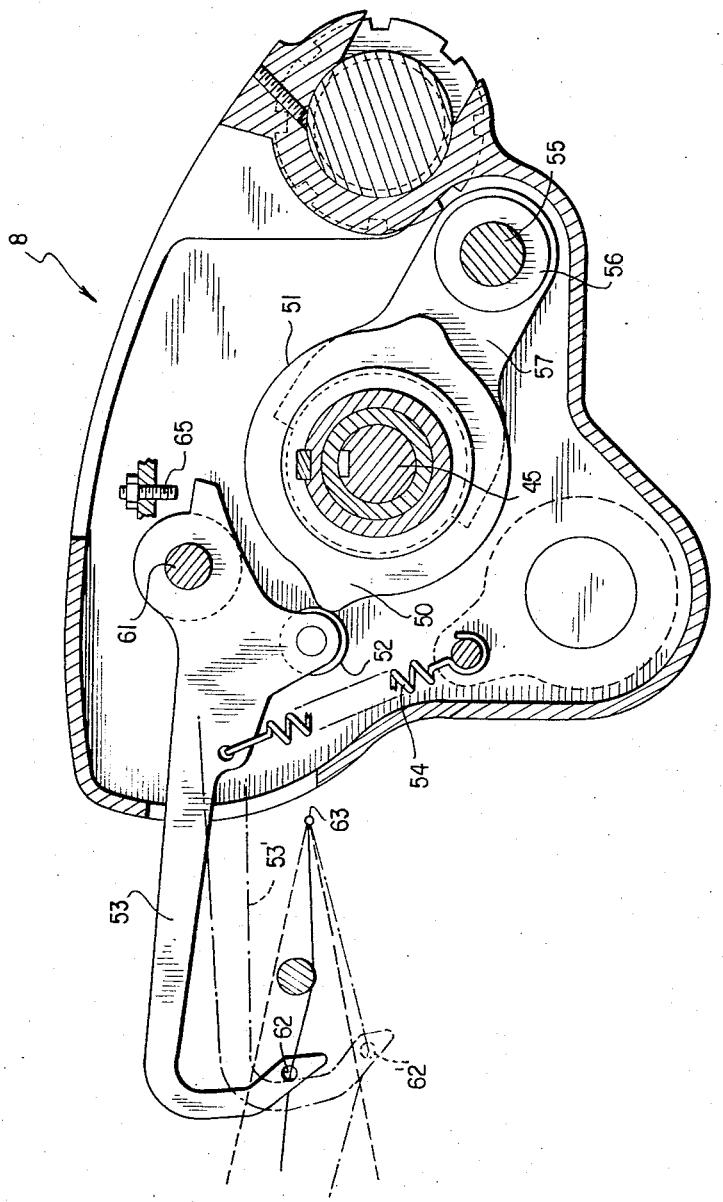

The invention will be further illustrated by reference to the accompanying drawings in which:

FIGURE 1 is a front view in elevation of one embodiment of the shuttleless of the invention, FIGURE 2 is a sectional view taken on line II—II of FIGURE 1, FIGURE 2a is a sectional view of a detail of the loom taken on line IIa—IIa of FIGURE 2, FIGURE 2b is a sectional view of a detail taken on line IIb—IIb of FIGURE 2, FIGURE 3 is a sectional view of the weft thread feeding device taken on line III—III of FIGURE 1, FIGURE 4 is a top plan view of the weft thread feeding device, FIGURE 5 shows, in a segment according to FIGURES 1 and 2, the transmission gear system mounted between the cam drive and the weft thread inserting device, FIGURE 6 shows, in a segment of FIGURE 1, a detail of the device for the insertion of the weft thread, in an enlarged scale, FIGURE 7 is a sectional view taken along line VII—VII of FIGURE 8, FIGURE 8 shows, in a segment of FIGURE 1, a driving pinion of the gripper systems in conjunction with the roller guides, in an enlarged scale with respect to FIGURE 1, FIGURE 9 is a sectional view taken on line IX—IX of FIGURE 6, FIGURE 10 shows a detail of the weft thread inserting device in which the gripper rod is shown in longitudinal section, and FIGURES 11 through 15 are cross-sectional views of various designs of gripper rods employed for the insertion of the weft thread.

The embodiment of the invention illustrated is a loom in which the insertion of the weft thread into the shed is effected by means of two gripper rods and corresponding gripper heads which execute an oppositely-directed movement to the central area of the reed and the weft thread, or threads in the case of multicolored weft thread insertions, are removed from a supply or delivery spool, or spools, mounted on a stationary part of the machine and are transferred or delivered in the center of the reed from one gripper to the other.

A general view of the loom of the present invention is shown in FIGURE 1. The machine includes a plurality of main elements, the relative arrangement of which is apparent from FIGURE 1. As shown therein, the loom includes the two side walls 10 and 11 which are connected at the bottom of the machine by traverse bars 20, only the foremost one of which is visible in FIGURE 1. Mounted at the left-hand side of the machine is the driving unit 2 including the motor 13 and the V-belt transmission 14. All other driving parts of the loom are driven from this central driving unit. Before enumerating further details of the loom drive, several other elements of the machine will be referred to for the purpose of presenting a complete picture of the total construction. At the right-hand side of the loom outside of the side wall 1 a shed controlling machine 21 is mounted from which the heddle frames 99' are driven by means of reversing levers and intermediate rods 21' mounted on the cross bar 20. The drive of the heddle frames themselves is effected in a conventional manner and is not further illustrated. Mounted in front of the heddle frames 99' is the reed 34 on the rotatable shaft 28. In FIGURE 1, a spreading roller 96 is mounted in front of the reed 34 and extends from the left to the right.

The insertion of the weft thread is effected by means of rigid gripper rods which are adapted to be advanced and retracted and which are not specifically illustrated in FIGURE 1. The protective tubes or housings 102 which enclose the gripper rods, in the retracted position thereof, and which project laterally, are shown, as are the units 5 for driving the gripper rods. Mounted behind the gripper rod drives 5 and the protective tubes 102 are the cone supports 27 with the stationary weft thread supply cones 27' shown therein in phantom. Only two supply cones on each side have been illustrated in FIGURE 1. The number of the cones depends, of course, upon the number of the various colors employed. Also illustrated in FIGURE 1 between the gripper rod drives 5 and the reed 34 are the thread feeding devices 8 which place the weft thread, drawn from the weft supply 27', in front of the gripper rods.

On both sides of the machine at the loom walls 10 and 11 and mounted within the housing, which constitutes a single unit, is a driving and transmission unit 4 for the gripper rod drive. Details of the gripper rod drive are shown in FIGURES 2, 2a and 2b, and 5 to 10, respectively. Mounted in the same housing are the driving and transmission means 3 for driving the reed. This driving unit 3 is shown more clearly in FIGURE 2. Also mounted on the left-hand side of the loom outside of the side wall 10 is another transmission unit 6 for the weft thread selective feeding devices 8, which unit, starting from the gear 38, includes the members 40 to 45. The thread feeding devices 8 are displaceably mounted on the spreading roller 96 and, therefore, may be adapted and adjusted to a desired weaving width, making it possible to feed the correct weft thread length at all times. The drive for the weft thread feeding devices 8 on both sides of the loom is effected from the aforementioned transmission unit 6 and the elements 40 to 45 by means of the continuous shaft 45. Only the end of the shaft is visible in FIGURE 1; the shaft extends from the left to the right loom wall behind the spreading roller 96 and is not visible. A synchronous operation between the driving and transmission units 3, 4, and 5, on the two sides of the loom is assured by the means of the continuous shafts 15 for the gripper drive, 18 for the drive of the reed, and 28 for the reed. Inserted into each of these shafts is a coupling member 46 operating with an adjustable prestress. An essential advantage of these couplings 46 for the main driving shaft 15 and the shafts 18 and 28, is that the transmission units, mounted at both sides of the loom for the drive of the reed and the gripper rods, operate completely synchronously due to the fact that the torsion of the shafts, which occurs during the transmission of the drives from one side of the loom to the other, is compensated by the couplings 46. Furthermore, an essential advantage of the divided shafts being connected by couplings is that the loom may be mounted in a simple manner and no total disassembly is required when replacing the driving units or transmissions.

The loom of the invention operates quietly and with a safe drive of the gripper rods; it also requires little space. It includes no parts which project excessively from the sides thereof so that a compact arrangement, in a factory, of a large number of loom is possible.

The driving unit and the reed drive now will be described in detail with reference to FIGURES 2 and 2a. Flanged to one of the loom walls 10 and 11 is the driving motor 13 which drives, by means of a V-belt transmission 14, the main drive shaft 15 supported by the loom walls 10 and 11. The shaft 15 includes, in a torsion-rigid manner, a driving pinion 16 which meshes with a gear 17 on the shaft 18, which latter is a part of the reed drive 3. At the same time, the gear 17 meshes with the driving gear 22 for the drive of the gripper rod system 5. The shaft 18 for the drive 3 of the reed includes, in a torosion-rigid manner, two cams 23 and 24 having positive and negative, respectively, cam surfaces 25 and 26 for the operation of a rocker arm 29 which is mounted on the shaft 28. The rocker arm 29 is bifurcated at one end thereof, enclosing an angle between the two arms, and supported on each of the arms is a freely rotatable guide roller 30 and 31, respectively, each being in contact with one of the surfaces 25 and 26, respectively. A plurality of levers 33, carrying the reed and serving as reed supports, are mounted on the intermediate shaft 28 and are uniformly positioned over the entire width of the machine. As is apparent from FIGURES 1, 2 and 2a, the drive of the weft thread feeding device 8 is taken from the reed drive, i.e., from the shaft 18. The weft thread feeding device itself is illustrated in FIGURES 3 and 4. In addition to the gear 17, the reed drive shaft 18 carries another gear 37 which meshes with a gear 38 on a shaft 39, the gear 38 driving, through the shaft 39, a pair of bevel gears 40 and 41, an intermediate shaft 42, another pair of bevel gears 43 and 44, and the shaft 45 for the weft thread feeding device 8. The shaft 45 has a cam 50 mounted thereon, the cam surface 51 of which is engaged by the follower roller 52 on the weft thread lever 53. The follower roller 52 is maintained in constant abutment with the cam 50 by the tension spring 54.

In the embodiment illustrated, thread feeding means are mounted on both sides of the loom if the weft insertion is to be effected on both sides of the machine. Additionally present are a plurality of thread feeding levers 53. The thread levers are connected with each other and with a color selector by means of a shaft 55. Mounted on the shaft 55 and rigidly secured to the housing by a bushing 56 is a shift dog 57, the bifurcated end of which engages an annular groove 58 of a cam. The cam, in turn, consists of a bushing 59 with the cam 50 mounted thereon and, as has been described above, the cam 50 is displaceable in a longitudinal groove 60 on the shaft 45 coupled to the loom drive so that the cam may be selectively pushed in front of any desired thread feeding lever. The cam 50, coupled with the loom drive, rotates constantly and actuates for each weft the particular thread feeding lever 53 to which it is coordinated at a particular moment. Accordingly, the cam 50 and the thread feeding device is pushed in front of the guide roller 52 of another thread feeding device so that now a different color is placed in readiness for the succeeding wefts for the gripper system of the loom. The thread feeding levers 53 are rotatably mounted on a shaft 61. FIGURE 3 illustrates the thread feeding lever 53, together with the eye 62 thereof, in the operating position. The position of rest is indicated at 53' in dashed-dotted lines and the warp threads of the shed are shown in dashed lines. The weft thread to be inserted extends from the position 63 in which it is bound in the selvage into the path of the schematically illustrated gripper system, through the eye 62 of the thread feeding lever 53, being in the operating position thereof, to the supply, not shown. The other weft threads which are not needed extend as shown in dashed-dotted lines through the eyes 62' of the thread feeding levers 53' being in the position of rest. The reset or return movement of the thread feeding lever is limited by an adjustable abutment 65.

The drive of the gripper rod system now will be explained with reference to FIGURES 2 and 2b. Flanged to the wall 10 of the loom is a housing 70 containing the drive 4 of the gripper rod system 5. This drive includes the drive gear 22 mounted on the shaft 72, two cams 77 and 78 having positive and negative surfaces, 75 and 76, respectively, a rocking lever 82, rotatably mounted on an axle, and having at one end thereof the cam followers 79 and 80 in engagement with the cam surfaces 75 and 76, respectively, and, at the other end thereof, a gear segment 81. Mounted in the housing 70 is, as a structural unit, the transmission and reversing gear (FIGURE 5) which is driven by the rocking lever 82 and actuates the gripper system 5. The transmission 7 is composed of a pinion 87 on the shaft 86, a pair of bevel gears 88 and 89, an intermediate shaft 90, and a pair of spur gears 91 and 92, as well as a drive shaft 93 with the gripper drive pinion 94 mounted thereon. The spur gears 91 and 92 are exchangeable in order to vary the transmission. Accordingly, the path which is traversed by the grippers may be adjusted to the width of the fabric.

Additionally, as shown in FIGURE 2, reference numeral 95 identifies the feed roller, reference numeral 96 identifies the spreading roller, and reference numeral 97 indicates the cloth beam shaft. Reference numeral 98 identifies the warp beam shaft and reference numeral 99 designates the fabric to be wound on the cloth beam shaft. The heddle frames necessary for the formation of the shed are indicated at 99'.

FIGURES 6 to 15 schematically illustrate one of the gripper rods as well as the mounting support and drive therefor, together with other elements. Since both of the rod gripper systems are made completely identical, only one will be described. The gripper rod guide 100 is secured to the loom wall 10 and carries the protective tube or casing 102 enclosing the gripper rod 101. Also shown are the reed support 34 and the gripper device 103, the latter being rigidly mounted on the gripper rod 101 for receiving and transferring the weft thread. A roller bearing is utilized for the purpose of mounting and guiding the gripper rod 101 which latter is constituted, in the embodiment shown, of extruded rectangular tubes, the outer surfaces 104, 105, 106, and 107 of which serve as guideways or tracks. Pairs of rollers 109 and 109', and 110 and 110', respectively, are freely rotatably mounted on the gripper rod guide 100 and the horizontal axis of the gripper rod extends between them. The guide of the gripper rod 101 in the horizontal direction is effected by the pairs of rollers 109 and 109', whereas the guide in the vertical direction is effected by the guide rollers 110 and 110', the rollers abutting the corresponding guideways 104 and 106 and 105 and 107, respectively, of the gripper rod. A rack 112 is mounted in the gripper rod 101, in the direction of the longitudinal axis thereof, and the gripper drive pinion 94 meshes therewith. The pairs of rollers 109 and 109' and 110 and 110', respectively, are mounted on both sides at a distance from the gripper drive pinion 94. In order to prevent vibrations of the gripper rod 101, an additional guide mounting is provided in the protective housing 102 which additional guide is formed by a pair of rollers 115. The pair of rollers 115 has a corresponding distance from the other roller guides 109, 109', 110, and 110' and is particularly effective when the gripper rod 101 is retracted.

The second guide of the gripper rod may, however, also be formed by a sleeve bearing as is apparent from FIGURE 9. Reference numeral 116 identifies a sliding bearing member including a recess having the shape of the gripper rod 101. At the beginning of the sliding guide 116, chamfers are provided in a conventional manner for the running-in of the gripper rod end.

FIGURES 10 to 15 illustrate various designs of the gripper rod 101 in accordance with the invention.

FIGURE 11 shows a simple square hollow profile for the gripper rod 101 in a cross-sectional view. An extruded profile may be used, for example, but other profiles made in a different manner also may be employed. A rack 112 is mounted and secured within the profile. In the example shown, a rack made from synthetic material has been employed as it affords a considerable saving in weight as compared to metal racks. Additionally, synthetic material has the advantage that no lubrication is required. The attachment of the rack 112 in the hollow profile may be made by cementing but other means of attachment also may be employed. The hollow profile of the gripper rod is provided with an aperture extending in the longitudinal direction thereof constituting a slot 118 through which the gripper driving pinion 94 projects into the hollow profile and with which the teeth of the rack 112 constantly engage.

The configuration of the gripper rod 101 shown in FIGURE 12 represents a modification of that shown in FIGURE 11. In order not to have the drive pinion 94 project too far into the hollow profile, the teeth are provided as close as possible to the slot 118. For the purpose of ensuring a good attachment of the rack 112 in the hollow profile while simultaneously saving weight, a web portion 119 is formed at the side of the rack facing away from the teeth and extending in the longitudinal direction, with the aid of which the rack is supported in the hollow profile. Moreover, the lateral ends 121 of the slot 118 are bent over in a web-like manner so that they project beyond the profile proper. Mounted on the opposite side of the gripper rod 101 is a pair of rib portions or web portions 122 extending in the longitudinal direction of the rod. The rib or web portions 121 and 122, respectively, are mounted on the side of the gripper rod facing, during weaving, the warp threads of the shed. Between the pairs of web portions extend the thread to be deposited and the running thread part of the weft thread 126 to be inserted. In this manner, the shed may be partially closed while a part of the gripper rod is still positioned therein, without the weft thread being clamped in by the closing warp threads. The web portions 121 also may be added separately, for example, by cementing in the manner indicated for the web portions 122.

Another embodiment of the gripper rod is illustrated in FIGURE 13. A transverse web portion 128 is mounted in this case between the slot 118 in the hollow profile and the oppositely-positioned outer wall thereof. Two cavities are thus formed, one of which is designated by reference numeral 129 and remains empty, whereas the other cavity permits access to the rack 112 therein through the slot 118. This box-like construction or configuration of the profile affords considerable advantages for reasons of stability. Furthermore, the teeth of the rack are positioned closely adjacent the slots without large web portions 119, as in the embodiment of FIGURE 12, being required. Due to the elimination of the web portions 119 of the rack, a further saving of weight is obtained.

FIGURE 10 is a view in longitudinal section through the gripper rod and it is shown in this figure how the driving pinion 94 projects through the slot 118 in the hollow profile and is in operative engagement with the rack 112.

FIGURE 14 shows another modification of the box-like hollow profile for the gripper rod according to FIGURE 13. Here again, an intermediate web portion 128 is provided for reasons of stability. In place of the web portions or rib portions 121 and 122 shown in FIGURE 12, the side walls 130 of the box-like profile are extended in this case so that short web portions 131 are formed which have the same function as the web portions 121 and 122 in FIGURE 12 and which assure that the weft thread can not be clamped in. In this construction, moreover, the guide rollers 109, 109', 110 and 110' for the gripper rod 101 may be made wider than before.

The gripper rod shown in FIGURE 15 corresponds, in the construction thereof, to that of FIGURE 14 but with the modification that the slot 118 is no longer disposed at the bottom of the rod but is provided at the side thereof. This construction makes it possible to laterally mount the driving pinion 94 for the gripper rod. Short web portions 131 are again provided on the sides of the gripper rod facing the warp threads of the shed and enclose therebetween the weft threads 126, effectively preventing the weft threads from being clamped in when the shed closes.

The characteristic of the gripper rod construction is that a hollow profile is utilized which has a high resistance to bending and torsion and which further contains, at the inside thereof, a rack for the drive. Basically, however, any desired hollow profile can be employed, for example, a profile having a circular cross-section, but the box-like profile offers particular advantages due to the simple and safe mounting thereof, and the guide thereof by means of rollers being facilitated. Added thereto is the advantage, as compared to conventional arrangements with sleds or carriages for the gripper rods, that little space is required and only the rearwardly projecting gripper rod requires space. Because of the compact construction and the combination of mounting support and guide, the driving device itself requires practically no space projecting beyond the sides of the machine. The gripper rod itself is extremely light so that only very small masses need to be accelerated and braked. As a result of the profile chosen, the gripper rods have a sufficient amount of rigidity against bending or torsion and have very little vibration, so that both the transfer of the thread from the weft thread spool and the delivery of the thread to the oppositely-positioned gripper occurs faultlessly. As gripper devices, any usable construction may be selected, depending upon the particular requirements, and may be easily mounted on the end of the gripper rod.

A loom constructed in accordance with the present invention has the advantage that only extremely small masses need be accelerated and braked and therefore a quiet, uniform movement of the grippers during the insertion of the weft thread is made possible. It has the additional advantage that the individual transmissions of the drive to the weft thread inserting device and the shed are provided as independent structural units and an easy assembly and disassembly thereof is therefore made possible. Furthermore, mounted between the individual transmissions at the sides of the machine are means which guarantee the synchronous operation of the transmissions. A loom constructed as proposed by the invention requires a very limited space in which it can be set up and, thus, permits the erection of a number of such machines in a small factory area.

It will be obvious to those skilled in the art that many modifications may be made within the scope of the present invention without departing from the spirit thereof, and the invention includes all such modifications.

What is claimed is:

1. A gripper rod for use in a shuttleless loom which comprises a generally rectangular hollow rod having an aperture along one side thereof and a rack within the rod, the teeth of said rack facing and being inwardly of the aperture.

2. A gripper rod according to claim 1 in which the rack is adapted to be longitudinally inserted into the rod and is cemented therein.

3. A gripper rod according to claim 1 in which the rack is fabricated from a synthetic material.

4. A gripper rod according to claim 1 in which the rod has a transverse web between the aperture and the opposite wall.

5. A gripper rod according to claim 4 in which the rack is secured to the transverse web.

6. A gripper rod according to claim 1 in which the rod has, on the sides thereof adapted to face warp threads of a shed, one pair each of rib means extending in the longitudinal direction of the rod.

7. A gripper rod according to claim 1 in which the portions of the rod forming the longitudinal aperture project outwardly to form a pair of ribs.

8. A gripper rod according to claim 1 in which the rod has, on the sides thereof adapted to face warp threads of a shed, one pair each of rib means extending in the longitudinal direction of the rod and being positioned in extensions of the side walls of the latter.

9. A gripper rod according to claim 1 in which the rod is mounted between and supported by pairs of guide rollers.

10. A gripper rod according to claim 9 in which a driving pinion positioned between the guide rollers engages the rack.

11. A gripper rod according to claim 1 in which the rod is mounted on a loom directly adjacent the edge of a fabric therein.

12. A gripper rod according to claim 1 in which a portion of the rod retracted from a shed is enclosed in a protective tube connected to a mount for the rod.

13. A gripper rod according to claim 12 in which the protective tube has rod guide means therein.

References Cited

UNITED STATES PATENTS

| 865,283 | 9/1907 | Wattie | 139—127 |
| 2,125,894 | 7/1938 | Dewas | 139—123 |

FOREIGN PATENTS

| 261,587 | 6/1913 | Germany. |

HENRY S. JAUDON, *Primary Examiner.*

MERVIN STEIN, *Examiner.*